United States Patent [19]

Wolff et al.

[11] Patent Number: 4,754,020
[45] Date of Patent: Jun. 28, 1988

[54] PROCESS FOR PREPARING AROMATIC DIAZONIUM SALTS BY DIAZOTATION OF AMINES

[75] Inventors: Joachim Wolff, Bergisch-Gladbach; Karlheinz Wolf, Leverkusen; Reinhold M. Klipper, Cologne; Peter M. Lange, Leverkusen, all of Fed. Rep. of Germany

[73] Assignee: Bayer Aktiengesellschaft, Leverkusen, Fed. Rep. of Germany

[21] Appl. No.: 837,490

[22] Filed: Mar. 7, 1986

[30] Foreign Application Priority Data

Mar. 30, 1985 [DE] Fed. Rep. of Germany ....... 3511752

[51] Int. Cl.⁴ .................... C09B 29/00; C09B 29/033; C09B 62/24; C09B 67/44
[52] U.S. Cl. .................................. 534/581; 534/560; 534/561; 534/565; 534/582; 534/583; 534/632; 534/638; 534/775; 534/829; 534/887
[58] Field of Search ............................... 534/565, 581

[56] References Cited

U.S. PATENT DOCUMENTS

| | | | |
|---|---|---|---|
| 2,319,265 | 5/1943 | Rossander et al. | 534/565 X |
| 2,812,321 | 11/1957 | Eberhart et al. | 534/565 |
| 2,845,326 | 7/1958 | Streck | 534/565 X |
| 3,423,391 | 1/1969 | Kindler et al. | 534/565 |
| 4,378,970 | 4/1983 | Lienhard et al. | 534/565 X |

FOREIGN PATENT DOCUMENTS

| | | | |
|---|---|---|---|
| 626925 | 9/1961 | Canada | 534/565 |
| 2910199 | 9/1980 | Fed. Rep. of Germany | 534/565 |
| 809350 | 2/1959 | United Kingdom | 534/565 |

Primary Examiner—Floyd D. Higel
Attorney, Agent, or Firm—Sprung Horn Kramer & Woods

[57] ABSTRACT

A new method of diazotization consists in using as the diazotizing agent in an aqueous, aqueous organic or organic medium the system comprising salt of nitrous acid + acid insoluble in the reaction medium, in particular organic or inorganic cation exchangers having acid groups. The diazonium salt solutions thus prepared are immediately reacted with coupling components to give azo dyestuffs, the insoluble acid and/or its salt being separated off before or after the coupling.

2 Claims, No Drawings

PROCESS FOR PREPARING AROMATIC DIAZONIUM SALTS BY DIAZOTATION OF AMINES

The present invention relates to a process for preparing diazonium salts by diazotising diazotisable amines by means of salts of nitrous acid, in particular alkali metal salts such as the Na salts or alkaline earth metal salts, and acids, characterised in that the acids used are solid, preferably high-molecular, acids which are insoluble in the reaction medium, in particular organic or inorganic cation exchangers having acid groups.

The process is preferably carried out in an aqueous or aqueous organic medium, but can also be carried out in a purely organic medium, at temperatures of −20° C. to +50° C.

In general, the solid acids are used in at least stoichiometric amounts, i.e. in amounts of at least one equivalent of acid per mol of salt of nitrous acid.

The second equivalent of acid which is necessary for the diazotisation reaction can be a customary strong mineral acid such as HCl or $H_2SO_4$, but is preferably the sulpho or carboxyl group of the amine to be diazotised or, in the case of amines which are free of sulpho or carboxyl groups, the sulpho or carboxyl group of appropriately added dispersants such as ligninsulphonates or condensation products of formaldehyde with aromatic sulphonic acids.

In the process, the cation exchanger can preferably be present directly in the diazotisation mixture or outside, in the separately present medium in which the salt of nitrous acid is present.

The solid acids preferably used are:

Solid cation exchangers which carry acid groups, for example synthetic organic ion exchangers based on synthetic resin in bead or granulate form, for example strongly acid macroporous or gellike bead polymers based on crosslinked polystyrene which carry sulpho groups, for example the SC 180 cation exchanger from BAYER AG. Also possible are bead polymers based on polystyrene in which the styrene nuclei can be substituted by the following groups:

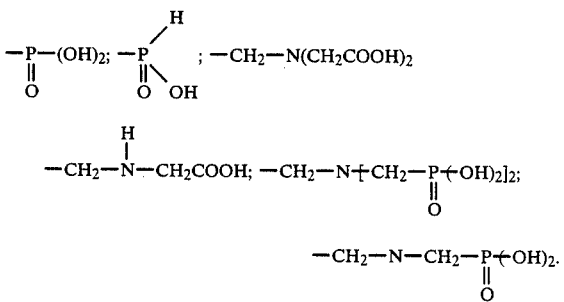

The solid acids can also be weakly acid cation exchangers having COOH groups in bead or granulate form, but preferably in bead form. These include cation exchangers based on crosslinked acrylic acid or crosslinked methacrylic acid or crosslinked and subsequently hydrolysed maleic anhydride. The crosslinking agents used therein are polyvinylaromatics and of these preferably divinylbenzene and octa-1,7-diene or hexa-1,5-diene alone or combined with divinylbenzene.

It is also possible to use solid ion exchangers having acid groups which have been prepared by condensation reactions. These include cation exchangers based on phenol or phenol derivatives which have been condensed with formaldehyde. Strongly acid cation exchangers having sulpho groups are formed by condensation of ring-sulphonated aromatics (phenolic acid or naphthalenesulphonic acid) with formaldehyde. It is also possible to prepare resins having —$CH_3$—$SO_3H$ groups based on phenol by simultaneous reaction of HCHO, sodium sulphite and phenol.

Corresponding condensation resins having carboxyl groups are prepared by reacting HCHO with for example 1,3,5-resorcylic acid or by reacting HCHO with phenoxyacetic acid, resorcinol-O-acetic acid or analogous compounds.

Also possible are weakly acid resins which have been prepared by condensation of phenol or resorcinol with formaldehyde. In addition to the synthetic organic cation exchangers it is also possible to use inorganic cation exchangers as solid acids. These include in particular the large class of zeolite minerals or the class of glauconites (green sands). The zeolites include inter alia mordenite (Ca, $K_2$, $Na_2$) $[AlSi_5O_{12}]_2 \times 6.6H_2O$ an natrolite $Na_2[Si_3Al_2O_{10}] \times 2H_2O$.

Cation exchangers of the stated kind are widely commercially available and described in the literature, cf. for example Ullmanns Enzyklopadie der technischen Chemie [Ullmann's Encyclopaedia of Industrial Chemistry], 4th edition, Volume 13, page 279–346.

The process according to the invention is very particularly suitable for diazotising ionic groups, in particular sulphate-containing amines, in an aqueous or organic aqueous medium.

The diazotisation can be carried out not only directly but also indirectly. In one version of the process, a dispersion or solution of the aromatic amine which preferably contains ionic groups is diazotised in water in the presence of at least equivalent amounts of a water-insoluble acid preferably with an alkali metal or alkaline earth metal nitrite. The nitrous acid required for the diazotisation is spontaneously formed by contact of the nitrite salt with the water-insoluble acid via cation exchange for $H^+$. In a further version of the process (indirect), the aromatic amine in water at pH 6–12, preferably 6–9, has added to it the amount of alkali metal or alkaline earth metal nitrite or of other nitrite salts which is necessary for the diazotisation, and the resulting solution or suspension is added to a suspension of the water-insoluble acid, and diazotisation sets in spontaneously.

The removal of the salt formed in the course of the diazotisation reaction, in particular the alkali metal or alkaline earth metal salt of the water-insoluble acid, is effected simply by sieving or filtration either immediately after the diazotisation or after the subsequent coupling to form the azo dyestuff.

After the diazotisation has been effected, the reaction with the coupling components is carried out in conventional manner, preferably in the presence of inorganic or organic basic compounds, if desired in the presence of water-miscible organic solubilisers or hydrotropic compounds or anionic or nonionic dispersants, for example condensation products of aromatic sulphonic acids, for example naphthalene-mono-, -di- or -tri-sulphonic acids, oxyditolylsulphonic acids, terphenylsulphonic acids and formaldehyde or reaction products of alkanols with alkylene oxides such as ethylene oxide.

Said solubilisers, hydrotropic compounds and dispersants can also be added earlier to the diazotisation mixture.

Suitable basic compounds for the coupling—in particular for anionic dyestuffs—are those whose cation leads to an improvement in the solubility of the dyestuff, preferably basic Li compounds such as LiOH, Li$_2$CO$_3$, primary, secondary, tertiary or quaternary amines, in particular mono-, di- and tri-alkanolamines or the corresponding ethoxylated or propoxylated derivatives, morpholine or ammonium hydroxide.

Suitable water-miscible organic compounds and/or hydrotropic compounds are for example monohydric or polyhydric alcohols, low-molecular ethers, glycol ethers, water-soluble aliphatic or cyclic amides, lactams, preferably ε-caprolactam or N-alkylpyrrolidones, and/or lower aliphatic sulphoxides and/or sulphur-containing compounds such as dimethyl sulphone, sulpholane and α- and β-substituted derivatives and/or hydrotropic compounds such as urea and its derivatives, particularly preferably N,N'-dimethylurea and/or mixtures with amines such as triethylamine, triethanolamine.

In the case of reactive dyestuffs, it is of course only possible to use such compounds which are incapable of any reaction with the reactive group which might reduce the tinctorial strength, preferred examples being ε-caprolactam, N-alkylpyrrolidone, dicyanodiamide, dimethyl sulphone and/or N,N'-dimethylurea.

The present invention accordingly also relates to a process for preparing azo dyestuffs, preferably sulpho-containing reactive dyestuffs, by reaction of diazonium salts with coupling components, characterised in that the diazonium salts are prepared by the process described above. The process is preferably carried out in aqueous or aqueous-organic medium under the above-mentioned reaction conditions and preferably finds utility for preparing azo dyestuffs having ionic water-solubilising groups, in particular those having sulpho, carboxyl, dihydroxyphosphoryl, sulphamoyl and disulphimide groups.

Preferably the coupling is carried out using basic Li compounds such as LiOH or Li$_2$CO$_3$ and primary, secondary, tertiary or quaternary alkylamines or alkylammonium compounds, in particular those having a C$_1$–C$_4$-alkyl group or C$_2$–C$_4$-hydroxyalkyl group or optionally ethoxylated or propoxylated C$_2$–C$_4$-hydroxyalkyl group, morpholine or ammonium hydroxide.

If amines or ammonium hydroxide are used, the results are azo dyestuffs which are practically free of inorganic salts.

The invention accordingly also relates to a process for preparing concentrated aqueous, aqueous organic or organic solutions of azo dyestuffs, characterised in that an aromatic amine is diazotised in an aqueous, aqueous organic or organic medium by the process described above and is then reacted with a coupling component, the high-molecular, solid acid being separated off before or after the coupling.

If basic lithium compounds are used as acid acceptors in the coupling, the results obtained directly and without intermediate isolation of the dyestuffs are stable concentrated solutions having a very low Na cation content. If ammonium hydroxide or amines or ammonium compounds are used, the results are solutions which are practically free of inorganic salts.

Preferred solutions contain in addition to water for example

7–35% by weight, preferably 10–35% by weight, of dyestuff

0–35% by weight, of organic solubilisers and/or hydrotropic compounds and/or dispersants 0–2% by weight, preferably <1%, of inorganic salts and in the case of anionic reactive dyestuffs 0–3% by weight of buffer substances.

The new process is suitable in particular for preparing low-salt or salt-free preparations, in particular concentrated aqueous solutions or powder or granulate formulations of reactive dyestuffs.

Reactive dyestuff preparations generally have added to them buffer substances for the pH range 4.5–8.5, for example boric acid, phosphate and hydrogencarbonate buffer. The solutions can be dried, if desired, after addition of customary standardising agents, in conventional manner, for example by spray-drying. The results are low-salt powder or granulate formulations.

Suitable standardising agents are customary standardising agents, i.e. solid compounds which do not undergo reaction with the reactive group, such as, for example, polyphosphates, but preferably non-electrolytes such as polyvinylpyrrolidone, urea, salts of water-soluble aromatic sulphonic acid such as benzenesulphonic acid and anionic dispersants such as sulphated primary or secondary aliphatic alcohols having 10 to 18 carbon atoms, sulphated fatty acid amides, sulphated alkylenoxy adducts, sulphated partially esterified polyhydric alcohols, and in particular sulphonates, such as long-chain alkyl sulphonates, for example lauryl sulphonate, cetyl sulphonate, stearyl sulphonate, mersolates, sodium dialkylsulphosuccinates, such as sodium dioctylsulphosuccinate, such as taurides, for example oleyl-methyltauride (sodium salt), alkylaryl sulphonates, such as alkylbenzenesulphonates having straight-chain or branched alkyl chain with 7 to 20 carbon atoms and mono- and di-alkylnaphthalenesulphonates, such as nonylbenzenesulphonate, dodecylbenzenesulphonate and hexadecylbenzenesulphonate, and also 1-isopropyl-naphthalene-2-sulphonate, di-isopropylnaphthalenesulphonate and in particular condensation products of aromatic sulphonic acids and formaldehyde such as naphthalenesulphonic acids, oxyditolylsulphonic acids or terphenylsulphonic acids with formaldehyde and/or condensation products of cyclohexanone, formaldehyde and bisulphite and/or ligninsulphonates. It is also possible to add customary dedusting agents such as oils, oil/emulsifier mixtures or phthalate esters.

The low-salt solid azo reactive dyestuff (1) preparations prepared by the process according to the invention preferably have the following composition:

20–90% by weight (preferably 30–80% by weight) of reactive dyestuff, up to 5% by weight, preferably ≦2% by weight, of inorganic salt, up to 3% by weight of buffer substances for pH 6.5–8.5, and also if desired 10–70% of a concentration-increasing additive, 0–50% of customary standardising agents.

Particularly suitable reactive dyes are those of the formula

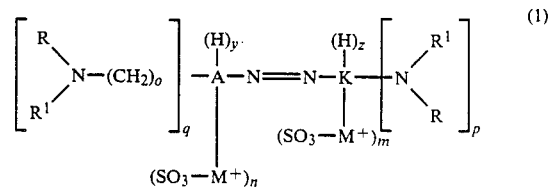

wherein

A = radical of a diazo component
K = radical of a coupling component
M+ = H, Li, Na, NH$_4$ or (N(R$^2$)$_4$ where
  R$^2$ = alkyl, in particular optionally OH-substituted C$_1$-C$_4$-alkyl or —(R$^3$O)$_t$—H where R$^3$ = C$_2$-C$_3$ alkyl and t = 2-5
R = reactive radical
R$^1$ = hydrogen or alkyl (C$_1$-C$_4$)
m, n = whole number from 0 to 6, where n+m = 1-6
o = 1 to 4
p, q = 0 or 1, where p+q = 1 or 2
y, z = 0 or 1, where y+z = 1 or 0 and where q+y = 1, and p+z = 1

Reactive radicals R is to be understood as meaning those which have one or more reactive groups or detachable substituents which under dyeing conditions in the presence of acid-binding agents are capable of reacting with the hydroxyl groups of cellulose or with the NH groups of natural or synthetic polyamides to form covalent bonds.

Suitable reactive groups which contain at least one detachable substituent bonded to a heterocyclic radical are inter alia those which contain at least one reactive substituent bonded to a 5- or 6-membered heterocyclic ring, such as monazine, diazine, triazine, for example pyridine, pyrimidine, pyridazine, thiazine, oxazine or asymmetrical or symmetrical triazine ring or such a ring system which has one or more fused-on rings, such as quinoline, phthalazine, cinnoline, quinazoline, quinoxaline, acridine, phenazine and phenanthridine ring system; the 5- or 6-membered heterocyclic rings which have at least one reactive substituent are accordingly preferably those which contain one or more nitrogen atoms and can contain 5- or preferably 6-membered fused-on carbocyclic rings.

Examples of reactive substituents on the heterocycle are:

halogen (Cl, Br or F), azido(—N$_3$), thiocyanato, thio, thiolether, oxyether.

Preference is given in the case of the present invention to reactive dyestuffs having reactive groups based on the following systems:

mono- or di-halogeno-symmetrical triazinyl radicals, mono-, di- or tri-halogenopyrimidinyl radicals or halogen-substituted quinoxalinylcarbonyl radicals.

Particular preference is given to the following reactive groups of the formula (2), (3) and (4):

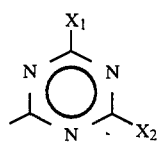
(2)

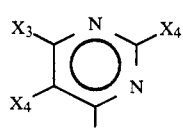
(3)

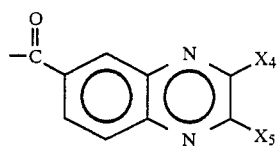
(4)

where in the formulae (2), (3) and (4):
X$_1$ = F
X$_2$ = Cl, F, NH$_2$, NHR$^2$, OR$^2$, CH$_2$R$^2$, SR$^2$
X$_3$ = Cl, F, CH$_3$
X$_4$ = Cl, F and
X$_5$ = Cl, F, CH$_3$
and where
  R$^2$ = alkyl (in particular optionally OH—, SO$_3$H—, COOH-substituted C$_1$-C$_4$-alkyl, aryl (in particular optionally SO$_3$H—, C$_3$-C$_4$-alkyl-, C$_1$-C$_4$alkoxy-substituted phenyl), aralkyl (in particular SO$_3$H—, C$_1$-C$_4$-alkyl-, C$_1$-C$_4$-alkoxy-substituted benzyl.

Dyestuffs which contain the abovementioned reactive group systems are known for example from the following publications:

U.S. Pat. No. 3,377,336, U.S. Pat. No. 3,527,760, British Pat. No. 1,169,254, U.S. Pat. No. 3,669,951, German Pat. No. 1,644,208, British Pat. No. 1,188,606, German Offenlegungsschrift No. 2,817,780, Spanish Pat. No. 479,771

The non-heterocyclic reactive radicals are for example β-chloroethylsulphonyl, β-acetoxyethylsulphonyl, β-sulphatoethylsulphonyl, β-thiosulphatoethylsulphonyl, -sulphatoethylsulphonylmethylamino and vinylsulphonylmethylamino groups.

EXAMPLE 1

1 mol of 1-amino-(4-aminobenzoyl)-8-hydroxy-3,6-naphthalenedisulphonic acid is reacted at 10° C. in 2,200 ml of water containing LiOH.H$_2$O at pH 4.5 with 1.05 mol of 2,4,6-trifluoro-5-chloropyrimidine. 1 mol of aminobenzene-2-sulphonic acid is dissolved in 600 ml of water by means of LiOH.H$_2$O under neutral conditions. After addition of 1,200 ml of a strongly acid gellike cation exchanger based on crosslinked polystyrene and having a capacity of 2 mol of SO$_3$H groups per liter, diazotisation is effected at 5° C. with 1 mol of 30% strength NaNO$_2$ solution. After the diazotisation has ended, the mixture is added at 10° C. to the coupling component, the coupling pH being maintained at pH 6 by addition of a condensation product of triethanolamine with 3 mol of ethylene oxide. After the coupling has ended, 700 g of ε-caprolactam and 1,000 ml of water are added. After the exchanger resin has been filtered off, the result obtained is a concentrated solution which contains 15% of the reactive dyestuff having the formula (5), relative to free acid.

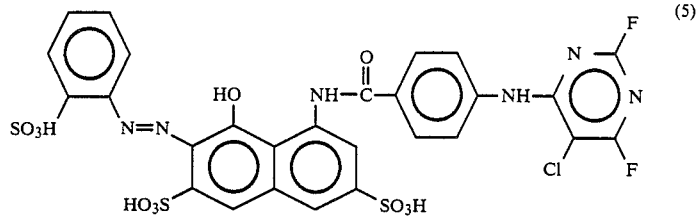

If the process of German Offenlegungsschrift No. 3,228,339 (diazotisation in 2 mol of $H_2SO_4$ and coupling with 2 mol of $CaCO_3$) is followed, the result obtained is merely a suspension of the reactive dyestuff (5).

EXAMPLE 2

1 mol of 1-amino-8-hydroxynaphthalene-3,6-disulphonic acid is dissolved in 1,000 ml of water by means of $LiOH.H_2O$ and is reacted with 1.15 mol of 2,4-difluoro-5-chloro-6-methylpyrimidine. 1 mol of 1-aminobenzene-2-sulphonic acid is dissolved in 800 ml of water by means of LiOH under neutral conditions, and 1,200 ml of a strongly acid gellike cation exchanger based on crosslinked polystyrene and having a capacity of 2 mol of $SO_3H$ groups per liter are added. To this suspension is added at 5° C. 1 mol of 30% strength sodium nitrite solution.

After the diazotisation has ended, coupling is carried out with a solution, prepared as described above, of the condensation product of 1-amino-8-hydroxynaphthalene-3,6-disulphonic acid with 2,4-difluoro-5-chloro-6-methylpyrimidine in the presence of 570 g of ε-caprolactam, while the pH is maintained at 6 with $LiOH.H_2O$. After addition of 1,000 g of water, filtering off of the cation exchanger leaves a concentrated solution which contains 15% of the reactive dyestuff. After addition of this concentrated reactive dyestuff solution to water in the presence of auxiliaries customary for reactive dyeing the result is a preparation for dyeing and printing natural or regenerated cellulose fibres in a red shade.

If, instead of using the abovementioned diazo components and coupling components, those of the table below are used, the results obtained are likewise stable, concentrated solutions.

| Diazo component | Coupling component |
| --- | --- |
| 1-amino-4-methylbenzene-2-sulphonic acid | 1-Amino-8-hydroxynaphthalene-3,6-disulphonic acid + 2,4-difluoro-5-chloro-6-methylpyrimidine with 10% N,N'—dimethylurea |
| 1-Amino-2-sulphonic acid | 1-Amino-8-hydroxy-4,6-disulphonic acid + 2,4-difluoro-5-chloro-6-methylpyrimidine |

EXAMPLE 3

1 mol of 4-aminoazobenzene-4'-sulphonic acid is suspended in 1,050 ml of water at pH 8 together with 1.05 mol of $NaNO_2$. This suspension is slowly added to a mixture comprising 2.1 liters of a cation exchanger described in Example 1, 1,050 ml of water and 10 g of $H_2SO_4$. After the diazotisation has ended, excess nitrite is destroyed with sulphamic acid, and the resulting solution is added to a solution of 1.05 mol of benzoyl-3-amino-8-hydroxynaphthalene-6-sulphonic acid in 1,400 ml of water and . . . g of a condensation product of triethanolamine with 3 mol of ethylene oxide (A). The pH is maintained at 5 during the coupling by addition of (A).

After the reaction has ended, (A) is used to set pH 8 and sufficient water is added for the storable solution to contain 13% of dyestuff.

EXAMPLE 4

1 mol of amine of the formula

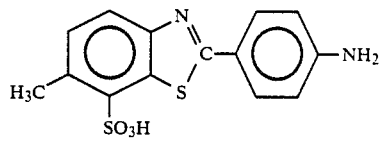

is dissolved in 1,500 ml of $H_2O$ together with 1 mol of a condensation product of triethanolamine with 3 mol of ethylene oxide (B). After addition of 1.2 mol of a gel-like cation exchanger described in Example 1 diazotisation is effected with 1.05 mol of 30% strength $NaNO_2$ solution. The resulting diazo solution is added to a mixture of 1 mol of barbituric acid, 1 mol of B dissolved in 410 mol of water, and during the coupling a pH of 7 is maintained by addition of B. After the resin has been filtered off the result is a solution which contains 14% of the dye.

What is claimed is:

1. In a process for preparing azo dyestuffs in an aqueous medium or an aqueous-organic medium, comprising conducting diazotation of aromatic amines with alkali metal salts of nitrous acid and acids, followed by a reaction with coupling components, the improvement comprising the acids being sulpho group-containing organic cation exchangers and the sulpho group-containing organic cation exchanger being separated off before or after the reaction with the coupling components.

2. In a process for preparing concentrated aqueous or aqueous-containing azo dyestuff solutions having a low inorganic salt content, comprising conducting diazotation of aromatic amines using alkali metal salts of nitrous acid and acids followed by reaction with coupling compounds, wherein basic lithium compounds, ammonium hydroxide, primary, secondary, tertiary or quaternary alkylamines or alkylammonium compounds are used as acid acceptors in the coupling reaction, the improvement comprising the acids being sulpho group-containing organic cation exchangers, wherein the sulpho group-containing organic cation exchangers are separated off before or after the reaction with the coupling compound.

* * * * *